US011196941B2

(12) United States Patent
Adema et al.

(10) Patent No.: US 11,196,941 B2
(45) Date of Patent: Dec. 7, 2021

(54) FIXTURE FOR ALIGNING TILED DISPLAYS

(71) Applicant: CHRISTIE DIGITAL SYSTEMS USA, INC., Cypress, CA (US)

(72) Inventors: Dan Adema, Kitchener (CA); Graham Hill, Waterloo (CA); Bryan Hemphill, Waterloo (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 5 days.

(21) Appl. No.: 15/620,256

(22) Filed: Jun. 12, 2017

(65) Prior Publication Data

US 2018/0359426 A1 Dec. 13, 2018

(51) Int. Cl.
*H04N 5/247* (2006.01)
*H04N 7/18* (2006.01)
*G06F 3/14* (2006.01)
*G09F 9/302* (2006.01)

(52) U.S. Cl.
CPC .......... *H04N 5/247* (2013.01); *G06F 3/1446* (2013.01); *G09F 9/3026* (2013.01); *H04N 7/181* (2013.01); *G09G 2300/026* (2013.01)

(58) Field of Classification Search
CPC ........ H04N 5/242; H04N 5/247; H04N 7/181; G06F 3/1446; G09G 2300/026
See application file for complete search history.

(56) References Cited

U.S. PATENT DOCUMENTS

| | | | |
|---|---|---|---|
| 5,889,568 A | 3/1999 | Seraphim et al. | |
| 6,219,099 B1 * | 4/2001 | Johnson | H04N 9/12 348/383 |
| 6,219,442 B1 * | 4/2001 | Harper | G01N 21/93 348/153 |
| 6,771,307 B2 | 8/2004 | Waki et al. | |
| 8,816,937 B2 | 8/2014 | Tsuida | |
| 9,047,039 B2 | 6/2015 | Perkins et al. | |
| 9,479,732 B1 * | 10/2016 | Saleh | H04N 5/3572 |
| 2001/0019358 A1 * | 9/2001 | Waki | H04N 9/3147 348/189 |
| 2006/0044215 A1 * | 3/2006 | Brody | G06F 3/1446 345/1.3 |
| 2012/0133616 A1 * | 5/2012 | Nishihara | G06F 3/03542 345/175 |
| 2013/0038991 A1 * | 2/2013 | Fang | F16M 13/02 361/679.01 |

(Continued)

FOREIGN PATENT DOCUMENTS

| CN | 105627926 A | 6/2016 |
|---|---|---|
| CN | 105975236 A | 9/2016 |

(Continued)

OTHER PUBLICATIONS

Chen, Yuqun, et al. "Automatic alignment of high-resolution multi-projector display using an un-calibrated camera." Proceedings of the conference on Visualization'00. IEEE Computer Society Press, 2000.

(Continued)

*Primary Examiner* — Md N Haque
(74) *Attorney, Agent, or Firm* — Perry + Currier, Inc.

(57) ABSTRACT

A fixture for aligning tiled displays is provided. The fixture includes a frame. The fixture further includes a vision system supported by the frame, the vision system configured to image at predefined display corner positions defined by given display dimensions. The fixture further includes an attachment mechanism configured to attach the frame to an array of tiled displays each having the given display dimensions, such that the vision system images positions of the array corresponding to respective corners of a tiled display in the array, and adjacent display corner positions.

9 Claims, 17 Drawing Sheets

(56) References Cited

U.S. PATENT DOCUMENTS

| | | | |
|---|---|---|---|
| 2013/0269882 A1* | 10/2013 | Bauman | G06F 3/1423 160/135 |
| 2014/0313423 A1 | 10/2014 | Johnson et al. | |
| 2015/0301781 A1* | 10/2015 | Ekkaia | F21V 17/105 362/237 |
| 2016/0299574 A1 | 10/2016 | Chen | |
| 2017/0186345 A1* | 6/2017 | Hemphill | G09F 9/3026 |

FOREIGN PATENT DOCUMENTS

| | | | |
|---|---|---|---|
| JP | 2002062826 | * | 2/2002 |
| JP | 2002062826 A | | 2/2002 |
| WO | WO-9929117 A1 | | 6/1999 |
| WO | WO-2016208918 A1 | | 12/2016 |

OTHER PUBLICATIONS

EPO, Extended European Search Report, dated Oct. 25, 2018, re European Patent Application No. 18177275.7.

Bresnahan, Glenn, et al. "Building a large-scale high-resolution tiled rear-projected passive stereo display system based on commodity components." Stereoscopic Displays and Virtual Reality Systems X. vol. 5006. International Society for Optics and Photonics, 2003.

CNIPA, FIrst Office Action, dated Nov. 25, 2019, re Chinese Patent Application No. 201810597220.5.

* cited by examiner

FIXTURE FOR ALIGNING TILED DISPLAYS

FIELD

The specification relates generally to tiled displays, and specifically to a fixture for aligning tiled displays.

BACKGROUND

Displays and/or display modules, such as direct-view LED (light emitting diode) displays and/or modules, are often tiled in arrays by generally mounting them to a support structure. Such mounting requires very precise alignment in order for the seams between the displays and/or display modules to not be visually objectionable. Current assembly methods involve operator visual alignment, and remote camera and/or operator brightness compensation to compensate for module seam variability, and are hence time consuming. Furthermore, remote camera techniques generally involve extensive camera setup and adjustment.

SUMMARY

The present specification is directed to an alignment fixture attachable to an array of tiled displays and/or modules, the alignment fixture including a vision system used to align corner pixels of tiled displays and/or modules to pixels of neighbouring tiled displays and/or modules. The vision system can comprise four cameras (and in particular small field-of-view cameras) mounted to the frame at predefined display corner positions as defined by given display dimensions, for example given dimensions of displays and/or modules that are to be aligned. The alignment fixture further includes an attachment mechanism used to attach the frame to an array of tiled displays for example such that the vision system images positions of the array corresponding to respective corners of a tiled display in the array, and adjacent display corner positions. Images from the vision system are used in aligning the tiled displays of the array.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

An aspect of the present specification provides a device comprising: a frame; a vision system supported by the frame, the vision system configured to image at predefined display corner positions defined by given display dimensions; and, an attachment mechanism configured to attach the frame to an array of tiled displays each having the given display dimensions, such that the vision system images positions of the array corresponding to respective corners of a tiled display in the array, and adjacent display corner positions.

In some implementations, the vision system comprises four cameras located at respective predefined display corner positions defined by the given display dimensions. In some implementations, the frame supports each of the four cameras such that respective lenses of the four cameras are at a given working distance from a front surface the tiled display.

In some implementations, the device further comprises a display device configured to render images from the vision system.

In some implementations, the device further comprises an interface to a remote computing device.

In some implementations, the attachment mechanism comprises magnets.

In some implementations, the attachment mechanism comprises electromagnets.

In some implementations, the attachment mechanism comprises one or more of suction cups and suction devices.

In some implementations, the attachment mechanism comprises one or more mechanical fasteners configured to attach the frame to a support structure of the array. In some implementations, the one or more mechanical fasteners are configured to mate with corresponding fastener openings in the support structure of the array.

An aspect of the present specification provides a system comprising: an array of tiled displays attached to a rear support structure such that corners of adjacent tiled displays are adjacent to one another, a respective position of each of the tiled displays being adjustable relative to the rear support structure, each of the tiled displays having given display dimensions; and, a device comprising: a frame; a vision system supported by the frame, the vision system configured to image at predefined display corner positions defined by the given display dimensions; and, an attachment mechanism configured to attach the frame to the array of tiled displays, such that the vision system images positions of the array corresponding to respective corners of a tiled display in the array, and adjacent display corner positions. In some implementations, the respective position of each of the tiled displays are further adjustable with respect to one or more of pitch, angle and rotation of the tiled displays.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
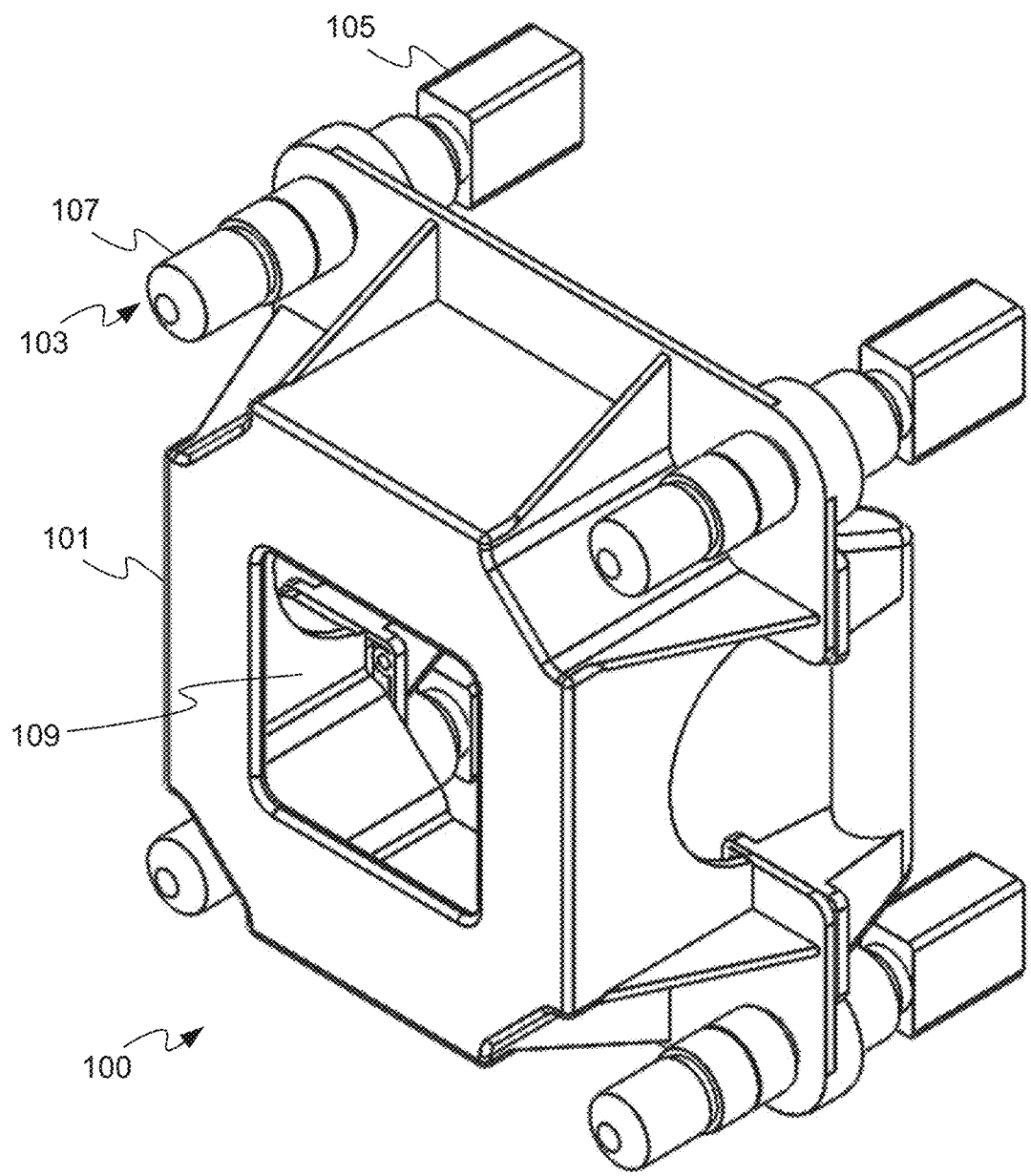
FIG. 1 depicts a rear perspective view of an alignment fixture, according to non-limiting implementations.
Figure 2:
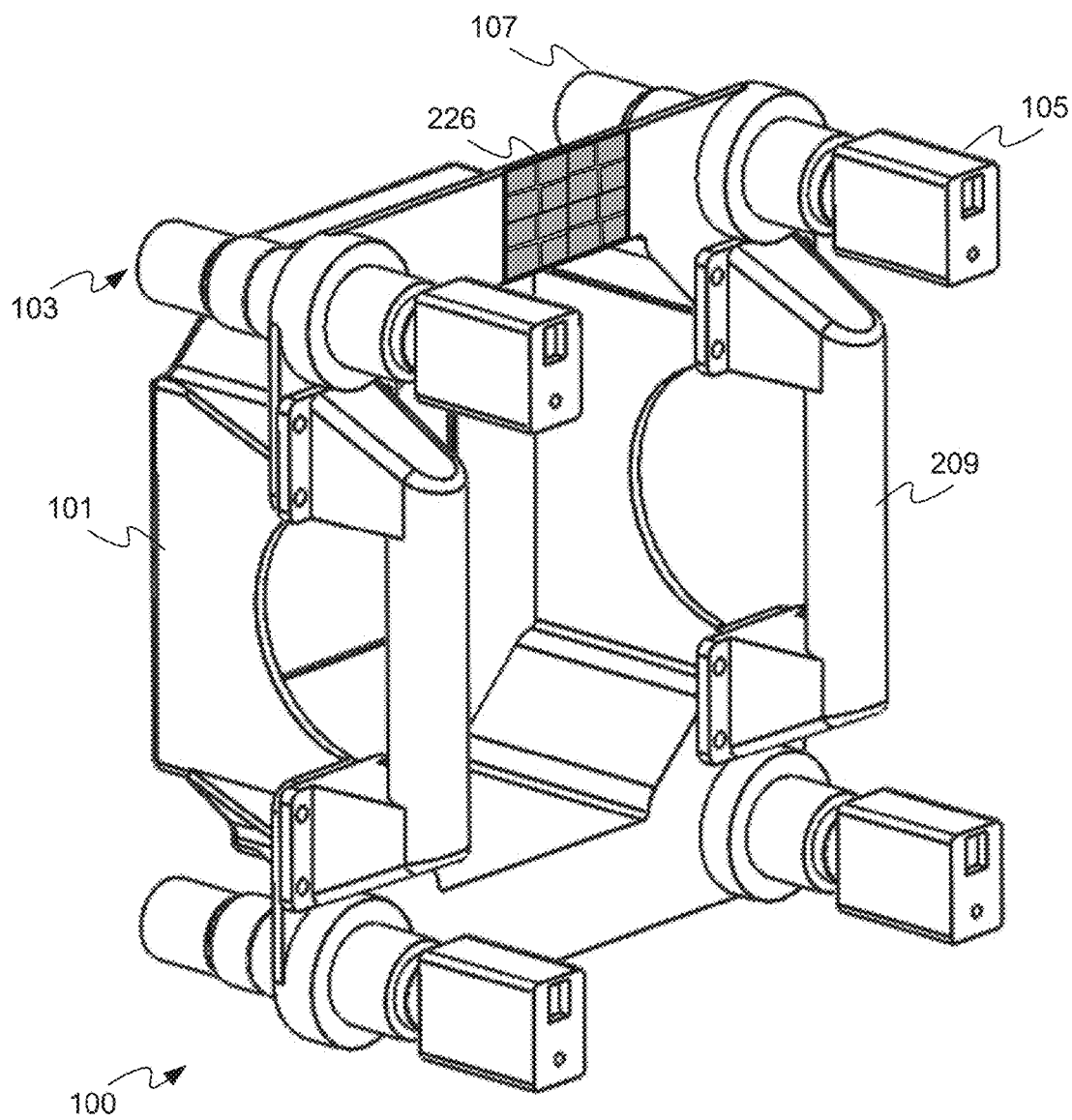
FIG. 2 depicts a front perspective view of the alignment fixture of FIG. 1, according to non-limiting implementations.

Attention is directed to FIG. 1 and FIG. 2 which respectively depict rear and front perspective views of an alignment fixture 100, interchangeably referred to hereafter as the fixture 100. The side of the fixture 100 that faces displays being aligned will be referred to as the "rear" of the fixture 100 and the opposing side and/or a user-facing side will be referred to as the front of the fixture 100. As depicted, the fixture 100 comprises a frame 101 and a vision system 103 supported by the frame 101, the vision system 103 configured to image predefined display corner positions defined by given display dimensions, as described in further detail below.

As will also be described in further detail below, with reference to FIG. 12 to FIG. 17, the fixture 100 further comprises one or more of a variety of possible attachment mechanisms configured to attach the frame 101 to an array of tiled displays each having the given display dimensions, such that the vision system 103 images positions of the array corresponding to respective corners of a tiled display in the array, and adjacent display corner positions. The attachments mechanisms include, but are not limited to, magnets, electromagnets, suction cups, suction devices, mechanical fasteners, and the like.

As depicted, the vision system 103 comprises four cameras 105 located at respective predefined display corner positions defined by the given display dimensions. Furthermore, as will be described in further detail below, the frame 503 supports each of the four cameras 105 such that respective lenses 107 of the four cameras are at a given working distance from the respective corners of a tiled display. In some implementations, the cameras 105 have a fixed focus, the given working distance selected according to the fixed focus. In other implementations, the cameras 105 are focusable, for example by manually and/or electronically adjusting the lenses 107.

The frame 101 can comprise any suitable material compatible with supporting the vision system 103, and of a size and shape compatible with supporting the vision system 103 when attached to an array of tiled displays. The frame 101 can include, but is not limited to, combinations of metals, plastics and the like. As best seen in FIG. 1, as depicted the frame 503 includes an aperture 109 between the front and rear sides to reduce the weight of the frame 101. As best seen in FIG. 2, the frame 101 includes handles 209 extending from the front side and/or user-facing side, the handles 209 configured for use in one or more of carrying and/or transporting the fixture 100, and/or positioning and/or removing the fixture 100 relative to an array of tiled displays.

The cameras 105 of the vision system 103 each comprise an electronic and/or digital camera, including, but not limited to, respective video cameras, with respective lenses 107 having fields of view compatible with imaging corners of tiled displays such that the tiled displays, and/or pixels of the tiled displays, can be aligned using an alignment mechanism. Other types of vision systems and/or numbers of cameras are within the scope of present implementations, as long as the vision system 103 and/or cameras of the vision system are configured to image positions of an array of tiled displays corresponding to respective corners of a tiled display in the array, as well as adjacent display corner positions, as described below. For example, the vision system 103 can comprise a single camera with fiber optics and lenses therefor configured to relay images from predefined display corner positions defined by given display dimensions to the single camera.

As also depicted in FIG. 2, in some implementations the fixture 100 comprises an optional display device 226 located, for example, on the rear side of the fixture 100 at the frame 101 and the like. The display device 226 when present, can alternatively extend across portions of the frame 101, for example across the aperture 109, between the handles 209, and the like. When present, the display device 226 renders images from the vision system 103. The optional display device 226 comprises any display device suitable for rendering images from the vision system 103, and which can be mounted to the frame 503, including, but not limited to, any suitable one of, or combination of, cathode ray tubes, and flat panel displays (e.g. LCD (liquid crystal display), plasma displays, OLED (organic light emitting diode) displays, capacitive or resistive touchscreens, CRTs (cathode ray tubes) and the like).

Figure 3:
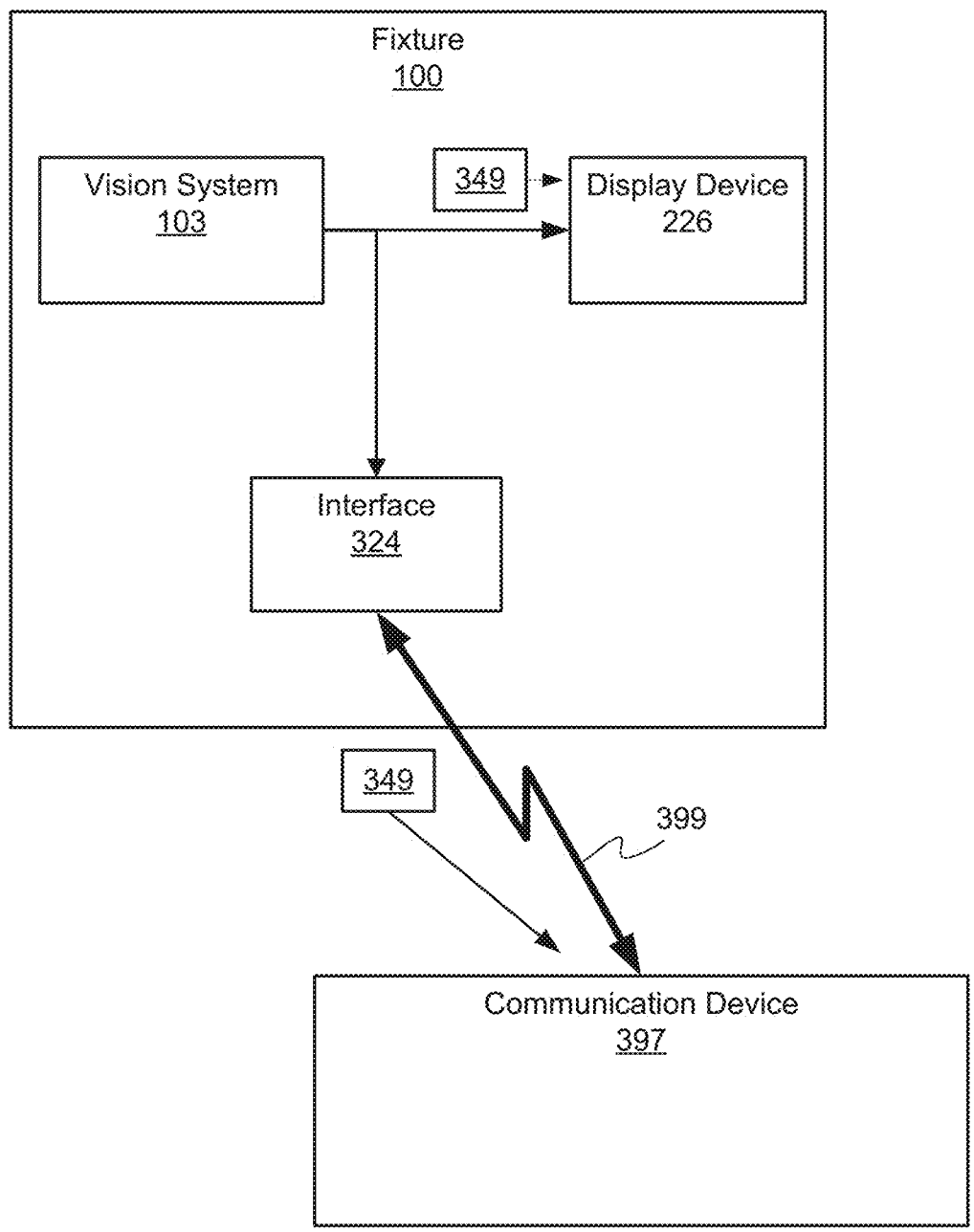
FIG. 3 depicts a block diagram of electronic components of the alignment fixture of FIG. 1, according to non-limiting implementations.

Attention is next directed to FIG. 3 which depicts a schematic block diagram of electronic components of the fixture 100. As depicted, the vision system 103 is in communication with the optional display device 226 and an interface 324. In general, the vision system 103 provides images 349 therefrom (e.g. images from each of the cameras 105) to the display device 226 and/or the interface 324 such that the images 349 can be used for aligning tiled displays.

The interface 324 can be wired or wireless as desired, and is generally configured to communicate with a communication device 397 via a link 399. The interface 324 hence comprises a wired or wireless network interface including, but not limited to, any suitable combination of a hardware port (e.g. a USB port a serial port, a parallel port), USB cables, serial cables, a wireless radio, a cell-phone radio, a cellular network radio, a Bluetooth™ radio, a NFC (near field communication) radio, a WLAN (wireless local area network) radio, a WiFi link radio, a WiMax radio, a packet based interface, an Internet-compatible interface, an analog interface, a PSTN (public switched telephone network) compatible interface, and the like, and/or a combination.

Furthermore, the fixture 100 can comprise one or both of the display device 226 and the interface 324, as long as images 349 from the vision system 103 are provided for aligning tiled displays.

The images 349 generally correspond to images of positions of an array of tiled displays corresponding to respective corners of a tiled display in the array, and adjacent display corner positions. Hence, for example, the images 349 comprise four image streams, one image stream for each of four corner positions, for example, an image stream from each of the cameras 105.

When the images 349 are provided to the display device 226, the display device 226 can be configured to cycle through the four image streams, or concurrently render the four image streams.

For example, with brief reference back to FIG. 2, the display device 226 is depicted as rendering four image streams, one for each of the cameras 105, for example, with the display device 226 divided into four quadrants, each quadrant showing an image stream from a closest one of the cameras 105 and/or a corresponding camera 105 (e.g. the upper right quadrant of the display device 226 provides the image stream from the upper right camera 105, the upper left quadrant of the display device 226 provides the image stream from the upper left camera 105, the lower right quadrant of the display device 226 provides the image stream from the lower right camera 105, the lower left quadrant of the display device 226 provides the image stream from the lower left camera 105; all directions and positions are described with reference to FIG. 2 only, and are not meant to imply global directions and/or positions).

Returning to FIG. 3, alternatively, and/or in addition to providing the images to the display device 226, the images 349 can be transmitted to the communication device 397 via the link 399, for rendering at an associated display device (not depicted) and/or used to control an automatic alignment system for aligning tiled displays, as described below.

While not depicted, the fixture 100 further comprises a power source, for example a connection to a mains power supply and a power adaptor (e.g. an AC-to-DC (alternating current to direct current) adaptor, and the like). In some implementations, the power source comprises a battery, a power pack, and the like.

Figure 4:
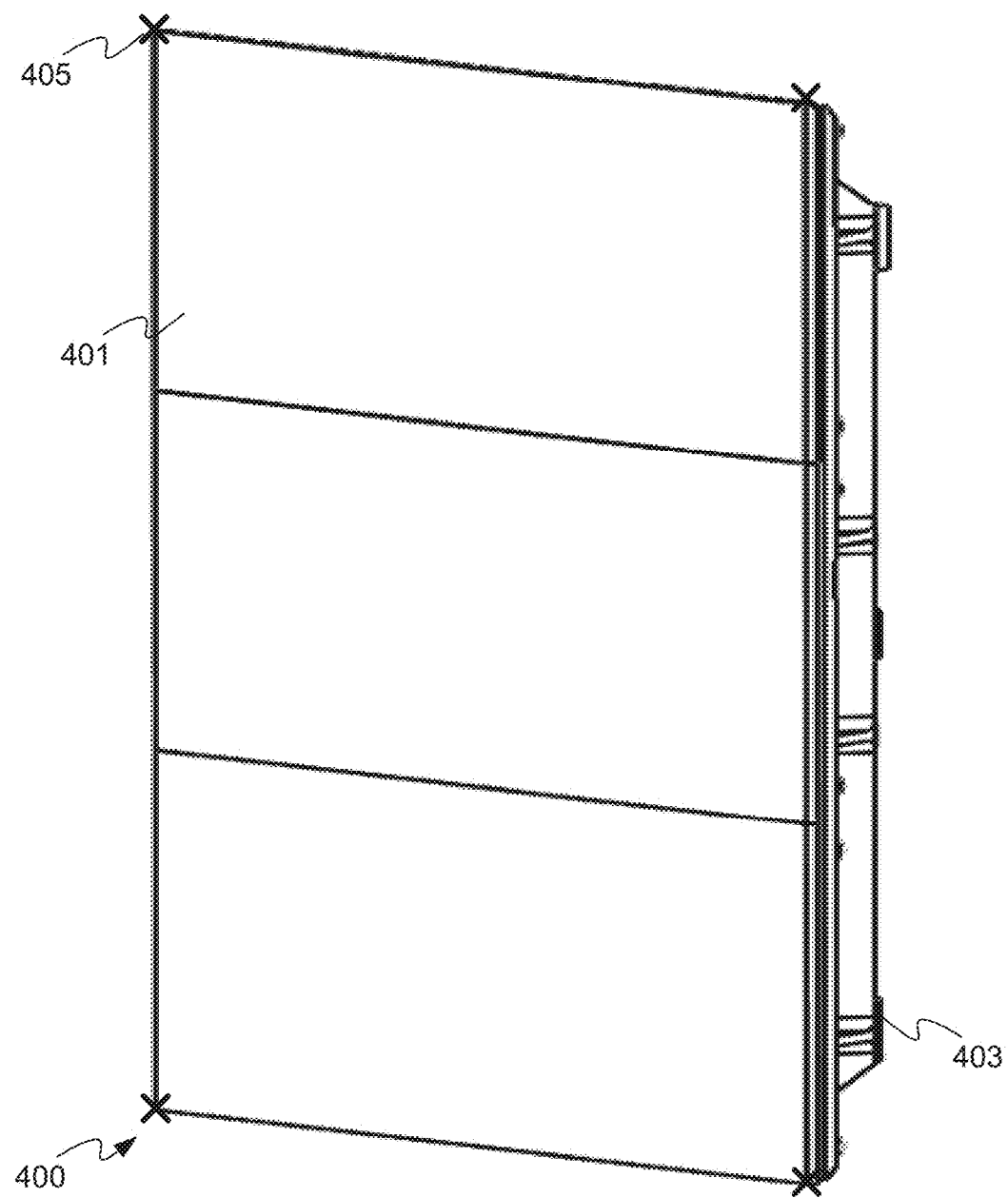
FIG. 4 depicts a perspective view of a display module that can be tiled with other display modules, according to non-limiting implementations.

Attention is next directed to FIG. 4, which depicts a perspective view of an example display unit 400 which can be tiled together with other similar display units in an array of tiled displays. As depicted the display unit 400 comprises three displays and/or sub-display units 401 which are supported by a rear support structure 403, for example a frame and the like. The display unit 400 can be provided with the sub-display units 401 already aligned with one another. The display unit 400 will be interchangeably referred to hereafter as the display 400. Indeed, while the display 400 comprises three sub-display units 401, the display 400 may include a single display, two sub-display units, or more than three display sub-units.

The display unit 400, and/or each sub-display unit 401, can generally comprise a light emitting diode (LED) display module, a liquid crystal display module, an OLED (organic LED) module, and the like.

Furthermore, the four corners positions 405 of the display unit 400 are indicated using an "X" in FIG. 4. The corners positions 405 are defined by the given display dimensions of the display unit 400, for example a given length, and a given width of the display unit 400, and the like. Such given display dimensions are generally used to configure the fixture 100 such that the vision system 103 is configured to image positions of an array of tiled displays 400 corresponding to respective corners of a tiled display 400 in the array, and adjacent display corner positions. In other words, the fixture 100 is generally of a size and shape generally configured to image corners of displays 400 of the given display dimensions.

Figure 5:
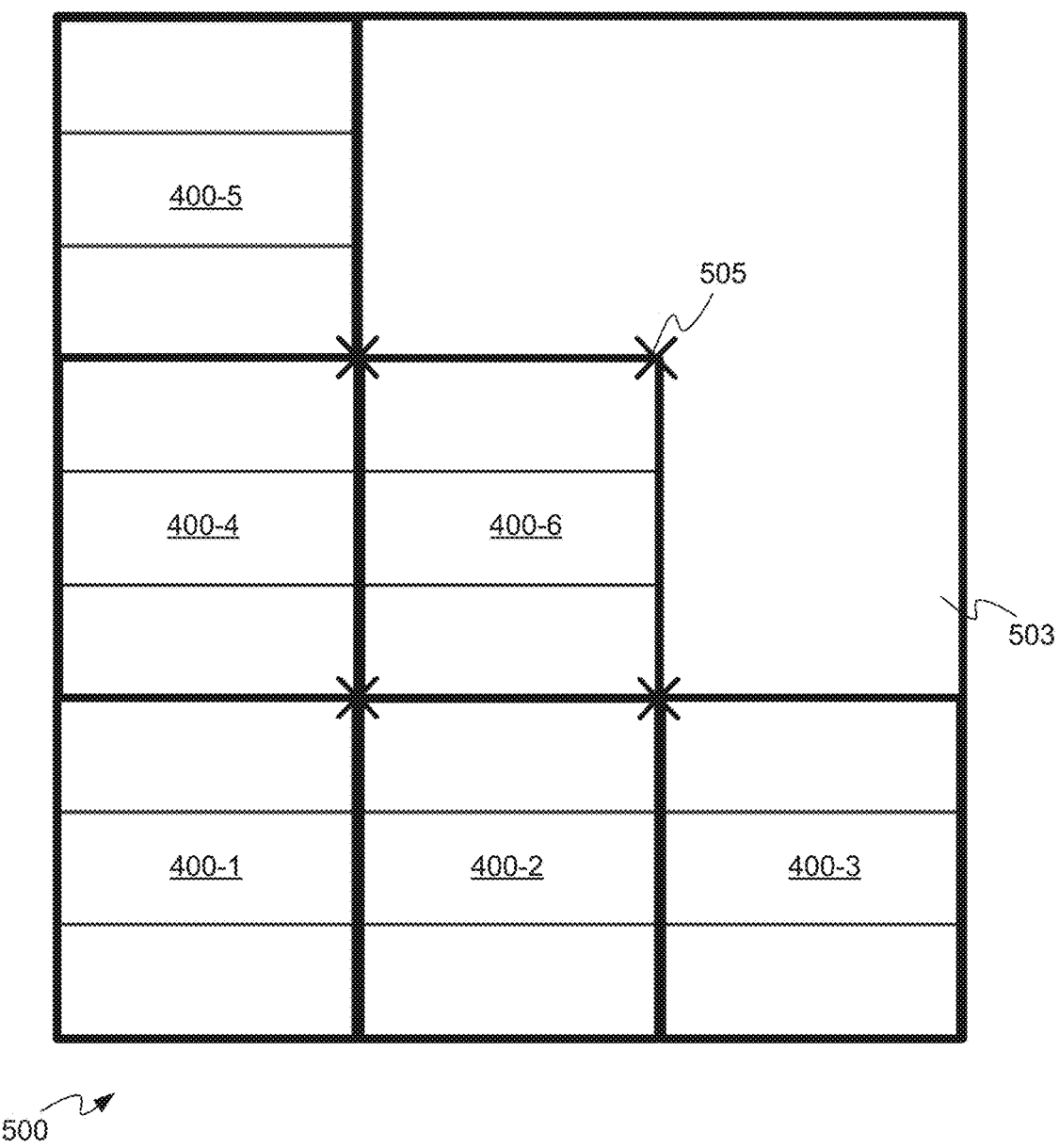
FIG. 5 depicts a front view of an array of display modules, according to non-limiting implementations.

Hence, attention is directed to FIG. 5, which depicts a front view of a plurality of displays 400-1, 400-2, 400-3, 400-4, 400-5, 400-6 (e.g. each similar to the display 400 depicted in FIG. 4, and collectively referred to as the displays 400) tiled together in an array 500 of displays 400, for example by attaching each of the rear support structures 403 of the displays 400 to a frame 503, and the like. Indeed, while not depicted, the frame 503 comprises devices, apertures, hooks, and the like, to which each of the displays 400 can be attached, using, for example, fastening devices, such as bolts, screws, clamps, and the like, using the rear support structures 403. While not depicted, it is further assumed that each of the displays 400 of the array 500 are in electrical communication with each other and/or with a device configured to provide images for rendering at the displays 400.

Furthermore, once a display 400 is attached to the frame 503, the position of the display 400 is adjustable to align a display 400 with adjacent displays 400.

For example, the display 400-1 can first be attached to the lower left hand corner of the frame 503. The display 400-2 is installed to the right of the first display 400-1, and the positions of the display 400-2 and/or the display 400-1 are adjusted until the displays 400-1, 400-2 are in alignment, for example using the fixture 100, as described below. Then the display 400-3 is installed to the right of the second display 400-3 and its position is also adjusted, for example using the fixture 100. The installation and alignment process for example using the fixture 100 continues, with the display 400-4 being installed above the first display 400-1, until a desired number of the displays 400 are tiled in an array supported by the frame 503.

As each display 400 is attached to the frame 503, the display 400 is aligned with adjacent displays 400 using the fixture 100, and one or more alignment mechanisms. Indeed, while not depicted, it is assumed herein that one or more alignment mechanisms is available to adjust the alignment of the displays 400 attached to the frame 503 including, but not limited to, mechanical adjustment mechanisms, cams, manual adjustment mechanisms, automatic adjustment mechanisms stepper motors, and the like. The one or more alignment mechanisms can be configured to adjust both a position of the displays 400 and a pitch and/or angle and/or rotation of the displays.

It is further assumed in FIG. 5 that the displays 400-1, 400-2, 400-3, 400-4, 400-5, have been installed and aligned, and that the centre-most display 400-6 (relative to the frame 503), has been attached to the frame 503 and is to be aligned at least with the adjacent displays 400-1, 400-2, 400-3, 400-4, 400-5.

In prior art systems, the alignment was performed using either visual inspection or using a remote camera system. In other words, an installation technician would mount a display 400 to the frame 503, visually inspect the alignment, and manually adjust a position of the display 400, relative to adjacent displays, until the visual alignment was deemed "acceptable". Alternatively, an image from a remote camera system imaging all the displays 400 attached to the frame 503 could be used as visual feedback during manual adjustment of the alignment of a display 400, the image from the remote camera system provided to a display device accessible to the technician performing the adjusting.

However, neither technique necessarily results in alignment acceptable to all viewers, and is generally performed on a "macro" level, without regard to small differences in pixel alignment between adjacent displays 400. Furthermore, a remote camera requires an extensive set-up procedure. Such issues can be obviated by the fixture 100.

Also depicted in FIG. 5 are predefined display corner positions 505 of the display 400-6, each indicated by an "X", similar to the corner positions 405, and defined by given display dimensions of the display 400-6 (and/or each of the displays 400). In order to align the display 400-6 with the adjacent displays 400-1, 400-2, 400-3, 400-4, 400-5, the fixture 100 is used to image the predefined display corner positions 505 (e.g. positions of the array 500 that correspond to respective corners of the tiled display 400-6 in the array 500, and adjacent display corner positions, for example positions of corners of the adjacent displays 400-1, 400-2, 400-3, 400-4, 400-5.

Figure 6:
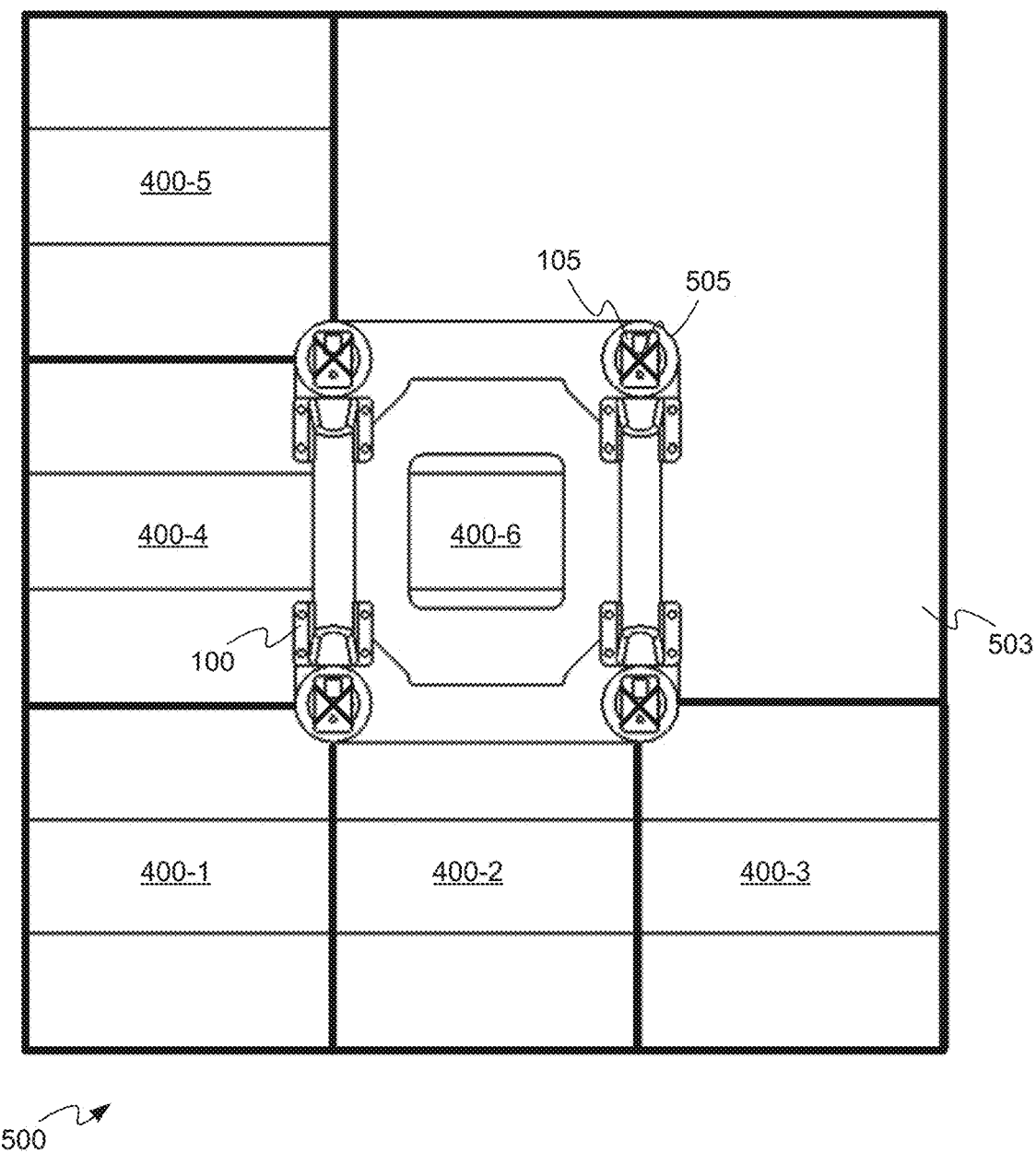
FIG. 6 depicts a front view of the alignment fixture of FIG. 1 attached to the array of display modules of FIG. 5, according to non-limiting implementations.
Figure 7:
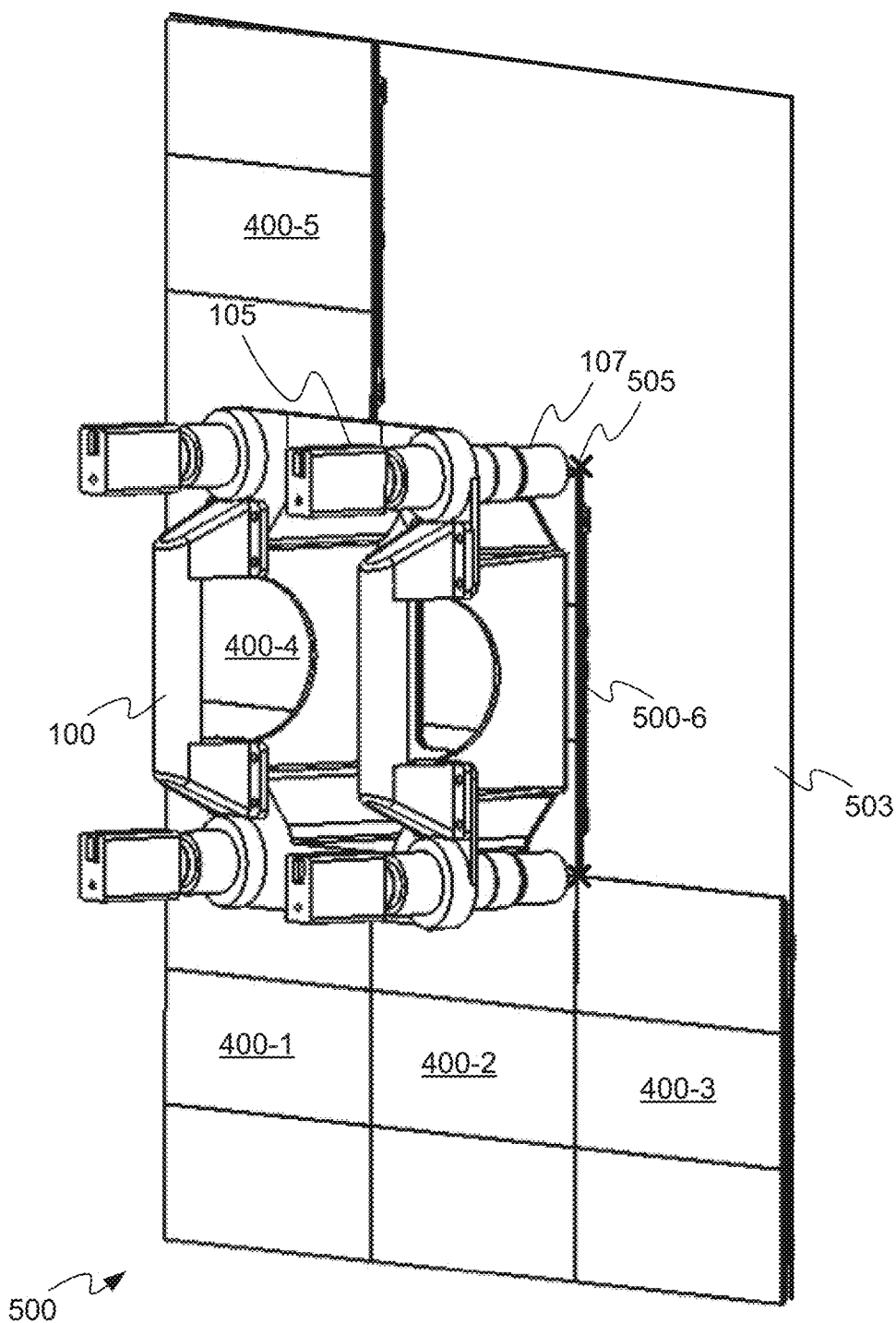
FIG. 7 depicts a perspective view of the alignment fixture of FIG. 1 attached to the array of display modules of FIG. 5, according to non-limiting implementations.

Hence, attention is next directed to FIG. 6 and FIG. 7 which respectively depict a front view and perspective view of the array 500 of displays 400, with the fixture 100 attached thereto. In particular, the fixture 100 has been attached to a front surface of the display 400-6 using an attachment mechanism of the fixture 100, in a position to image the predefined display corner positions 505. For example, as clearly seen in FIG. 6 and FIG. 7, the cameras 105 and the lenses 107 are positioned at the fixture 100 according to the predefined display corner positions 505; in other words, the geometry and/or physical layout of the cameras 105 and the lenses 107 is selected using the predefined display corner positions 505. Put yet another way, each of the cameras 105 and the lenses 107 are spaced apart and/or positioned at the fixture 100 and/or aligned with and/or located at positions corresponding to the predefined display corner positions 505. However, the positions of the cameras 105 and the lenses 107 need not be exactly aligned with the predefined display corner positions 505. Rather, the positions of the cameras 105 and the lenses 107 are selected to image the predefined display corner positions 505 at a display 400, as well as adjacent display corner positions.

Figure 8:
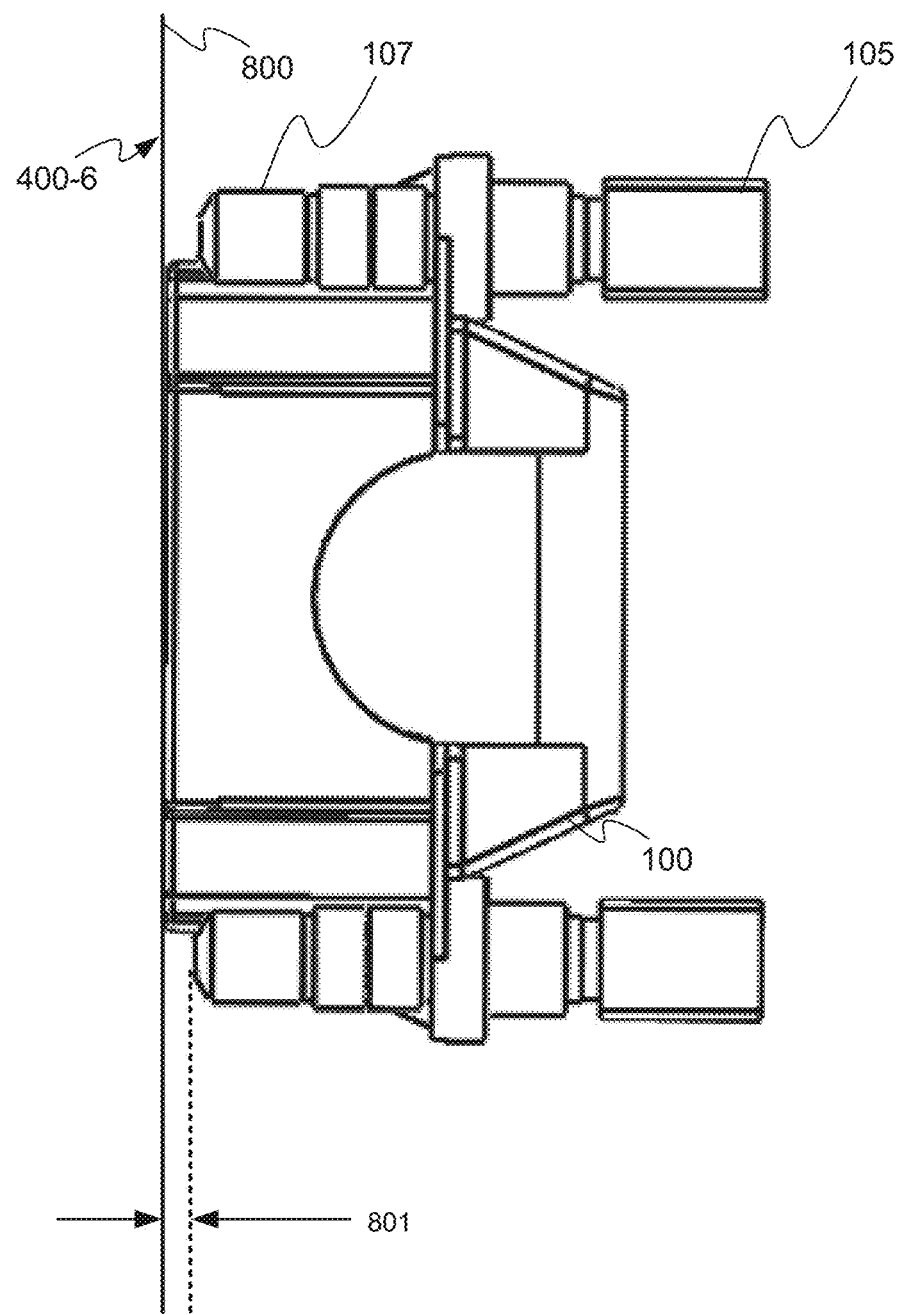
FIG. 8 depicts a schematic side view of the alignment fixture of FIG. 1 attached to the array of display modules of FIG. 5, according to non-limiting implementations.

Attention is further directed to FIG. 8 which depicts a side view of the fixture 100 attached to a front surface 800 of the display 400-6, similar to as depicted in FIG. 6 and FIG. 7, though the display 400-6 is depicted schematically showing only the front surface 800. In particular, FIG. 8 shows that when the fixture 100 is attached to the front surface 800 of the display 400-6 (or any of the other displays 400) the respective lenses 107 of the cameras 105 are at a given working distance 801 from the front surface 800 of the display 400-6. Put another way, the frame 101 supports each of the four cameras 105 such that respective lenses 107 of the four cameras 105 are at the given working distance 801 from the front surface 800 the tiled display 400-6.

For example, each of the lenses 107 have a respective field of view and depth of field which define the given working distance 801, and the lenses 107 are positioned relative to the frame 101 of the fixture 100 such that a distance between the lenses 107 and the front surface 800 the tiled display 400-6 is the given working distance 801. The given working distance 801 is selected such that the predefined corner positions 505, as well as adjacent display corner positions, will be in focus and viewable in the images 349.

However, in other implementations, the cameras 105 are focusable, for example by manually and/or electronically adjusting the lenses 107.

In any event, once the fixture 100 is attached to the array 500 of the displays 400, the images 349 are used to align the display 400-6 with the adjacent displays 400-1, 400-2, 400-3, 400-4, 400-5. For example, the images 349 can be rendered at the display device 226, and an alignment mechanism at the frame 503 and/or the display 400-6 (e.g. at a rear support structure 403) can be used to move the display 400-6 relative to the frame 503 and the adjacent displays 400-1, 400-2, 400-3, 400-4, 400-5 until the images 349 (rendered at the display device 226) indicate that the display 400-6 is aligned with the adjacent displays 400-1, 400-2, 400-3, 400-4, 400-5.

Alternatively, the images 349 can be provided to the communication device 397 and rendered at an associated display device. The images 349 are again used to align the display 400-6, assuming the associated display device is accessible to a technician performing the alignment.

Alternatively, the alignment mechanism comprises an automatic alignment mechanism, including, but not limited to one or more servo-motors, motorized cams, and the like, configured to adjust move the display 400-6 relative to the frame 503 and the adjacent displays 400-1, 400-2, 400-3, 400-4, 400-5. In these implementations, the communication device 397 receives and processes the images 349, and controls the alignment mechanism to adjust the position of the display 400-6 until the display 400-6 is aligned with the the adjacent displays 400-1, 400-2, 400-3, 400-4, 400-6.

Regardless of whether the alignment mechanism is manual or automatic, the alignment mechanism can be configured to adjust a position (e.g. up, down, left, right, and the like) of a display 400, and a pitch and/or angle and/or rotation of the display 400 (e.g. clockwise rotation or counter clockwise rotation). As the images 349 provide a close-up view of the predefined display corner positions 505 of the display 400-6, and the adjacent displays 400-1, 400-2, 400-3, 400-4, 400-5, a more accurate alignment can be achieved than when using a mere visual inspection and/or a remote camera system.

Figure 9:
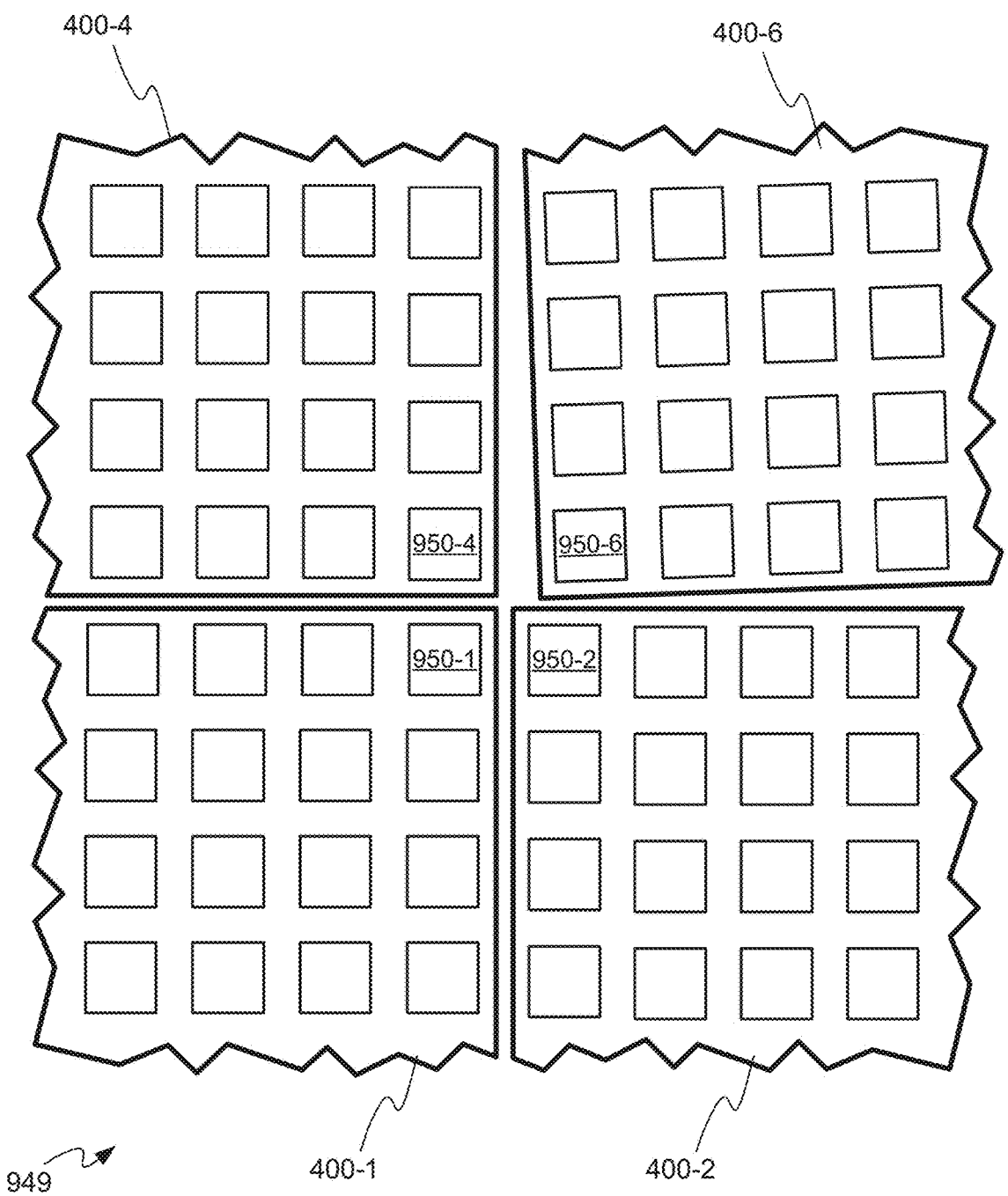
FIG. 9 depicts an image from the vision system of the alignment fixture of FIG. 1, before alignment occurs, according to non-limiting implementations.

Attention is next directed to FIG. 9 which depicts a portion of an image 949 from one of the cameras 105 (e.g. from one of the image streams of the images 349), for example the camera 105 which images a bottom left predefined display corner position 505 of the display 400-6, including adjacent corner positions of the displays 400-1, 400-2, 400-4. The image 949 further shows respective corner pixels 950-1, 950-2, 950-4, 950-6 of each of the displays 400-1, 400-2, 400-4, 400-6. The image 949

The image 949 clearly shows the displays 400-1, 400-2, 400-4 are aligned (e.g. the pixels of each of the displays 400-1, 400-2, 400-4 are aligned in rows and columns, including the respective corner pixels 950-1, 950-2, 950-4), but that the display 400-6 is out of alignment: the display 400-6 is both offset and rotated with respect to the displays 400-1, 400-2, 400-4.

Figure 10:
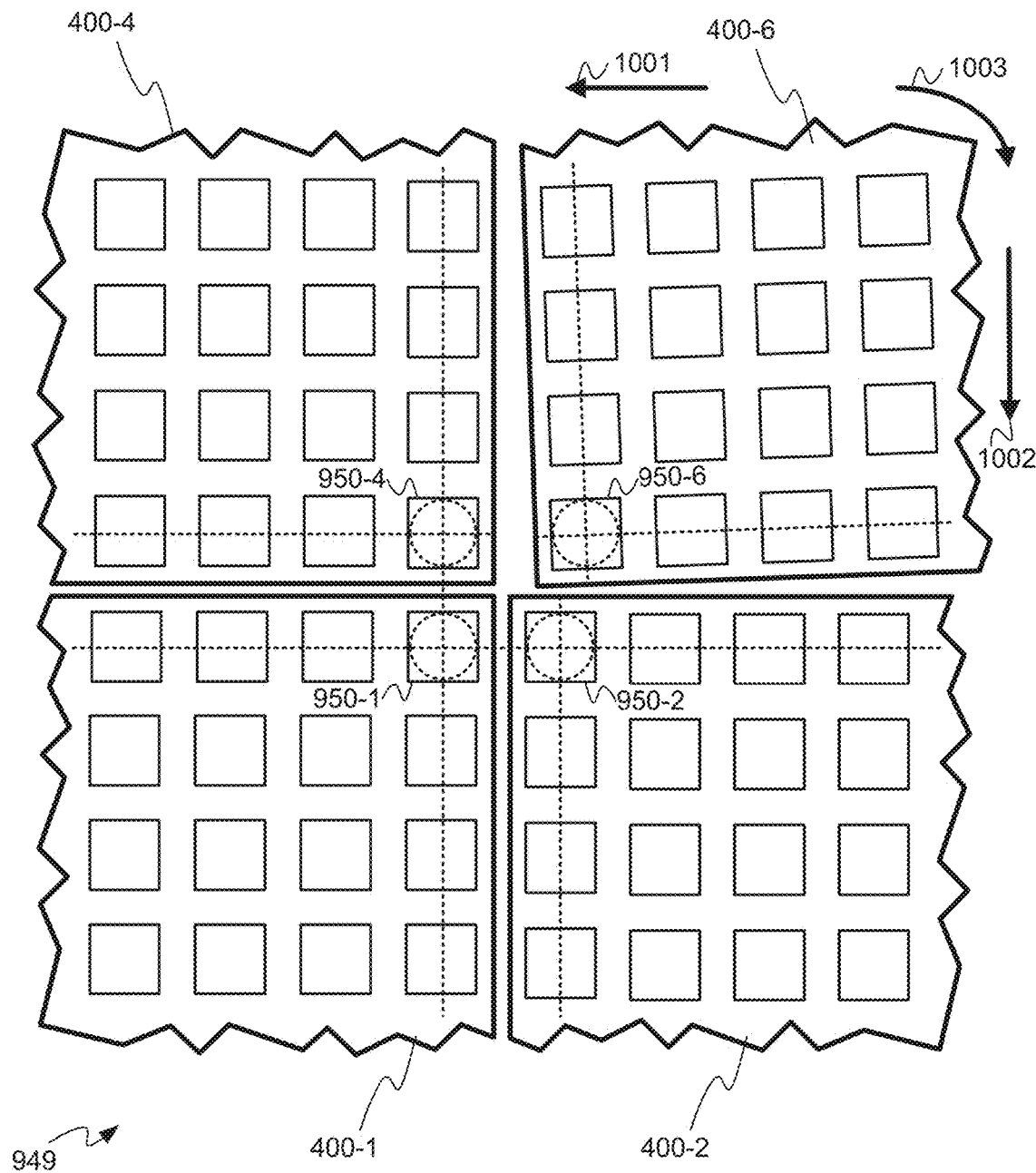
FIG. 10 depicts an image from the vision system of the alignment fixture of FIG. 1, as alignment is occurring, according to non-limiting implementations

For example, attention is next directed to FIG. 10 which depicts the image 949 with centroids of the respective corner pixels 950-1, 950-2, 950-4, 950-6 indicated by circles drawn in broken lines, and the alignment (or lack thereof) between the centroids indicated by broken lines extending perpendicularly from the respective corner pixels 950-1, 950-2, 950-4, 950-6. As the lines between the centroids of the respective corner pixels 950-1, 950-2, 950-4 align, the displays 400-1, 400-2, 400-4 are aligned. However, as the lines from the centroid of the corner pixel 950-6 are not aligned with the lines of the centroids of the respective corner pixels 950-1, 950-2, 950-4, the display 400-6 is out of alignment.

In automatic alignment techniques, the locations of the centroids are determined when an alignment system processes the image 949, for example an alignment system that includes the communication device 397. Such processing can include performing a best-fit of a series of pixels adjacent respective corner pixels 950-1, 950-2, 950-4, 950-6, and/or in rows or columns that include the respective corner pixels 950-1, 950-2, 950-4, 950-6. The alignment system can then automatically control the position of the display 400-6 in a feedback loop with receiving the image 949 until the centroids are aligned.

Figure 11:
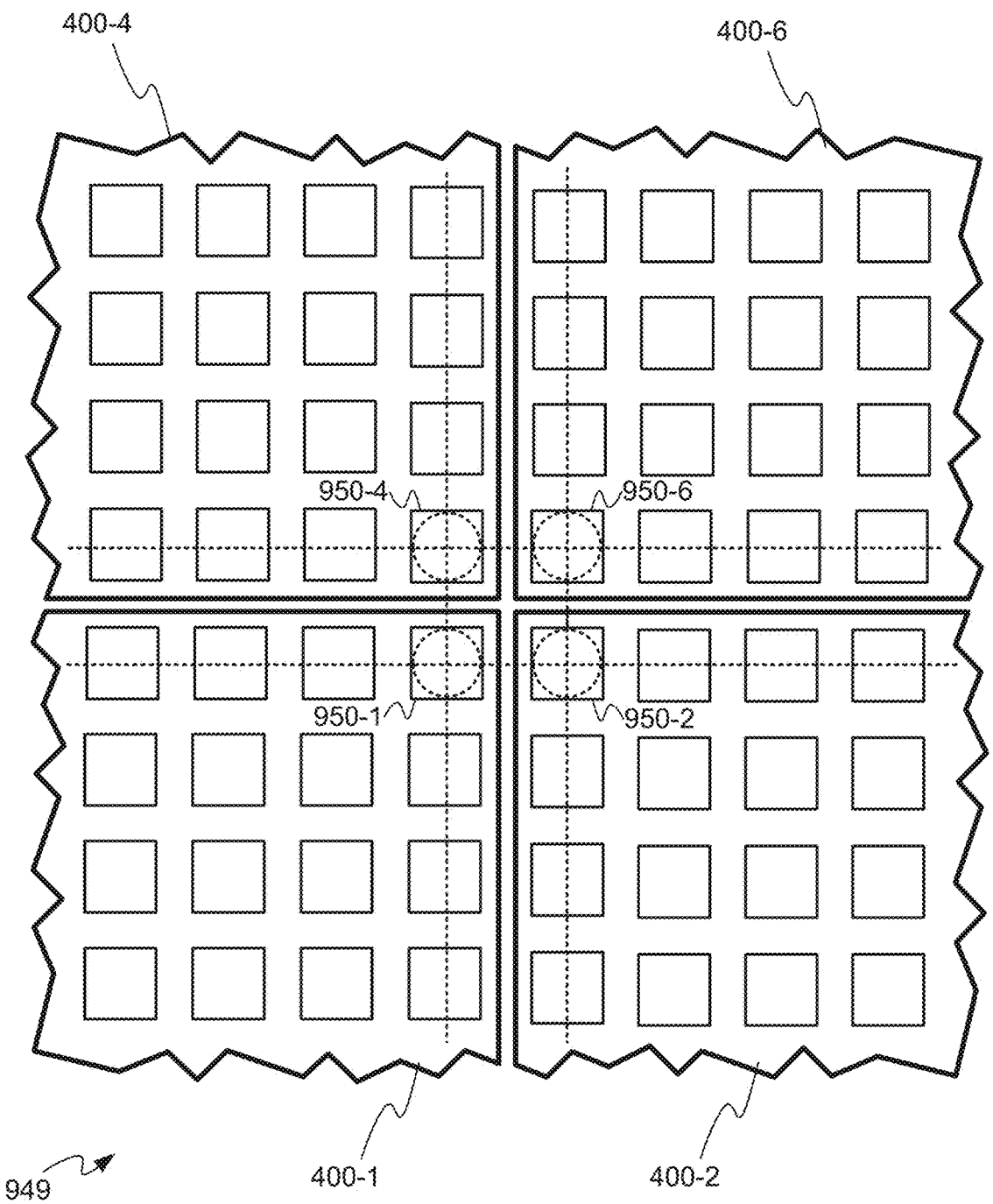
FIG. 11 depicts an image from the vision system of the alignment fixture of FIG. 1, after alignment occurs, according to non-limiting implementations.
Figure 12:
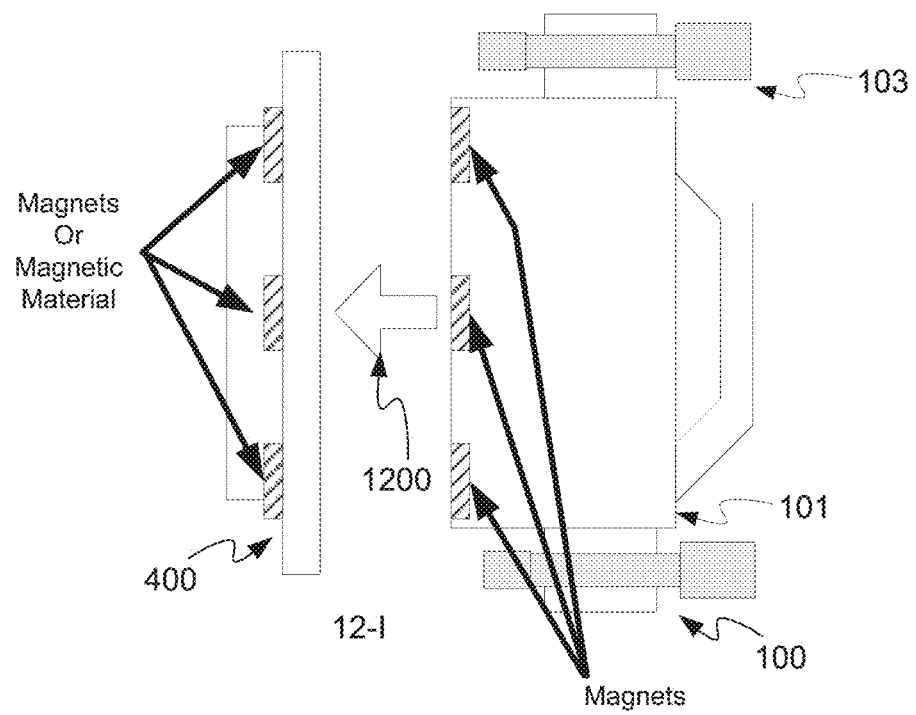
FIG. 12 depicts a schematic side view of a sequence of an alignment fixture being attached to a display, an attachment mechanisms of the alignment fixture including magnets, according to non-limiting implementations.
Figure 12:
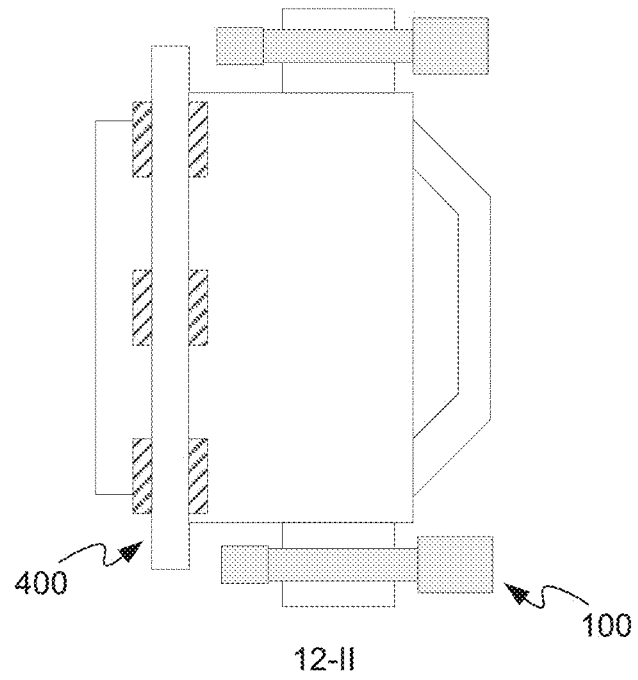

Whether the movement of the display 400-6 is manual or automatic, such movement can include, but is not limited to, adjusting the position (e.g. in directions indicated by the arrows 1001, 1002) and angle (e.g. in a direction indicated by the arrow 1003) of the display 400-6, using an alignment mechanism, until the display 400-6 is aligned with the displays 400-1, 400-2, 400-4, as depicted in FIG. 11.

Furthermore, the images 349 of two or more of the respective predefined display corner positions 505 can be used to perform the alignment. Indeed, alignment mechanisms and/or techniques that can be used to align the display 400-6 with the displays 400-1, 400-2, 400-4 using the images 349 will occur to persons of skill in the art and are within the scope of present implementations.

Once the display 400 is aligned, the fixture 100 is removed.

Furthermore, the alignment of the display 400-6 as described with reference to FIG. 6 to FIG. 11 can occur for each of the displays 400, as well as any further displays that are incorporated into the array 500.

Attachment mechanisms will now be described. For example, attention is next directed to FIG. 12 which depicts, in a view 12-I, a schematic side view of the fixture 100 being attached to a front surface of the display 400, as indicated by the arrow 1200, and, in a view 12-II, a schematic side view of the fixture 100 attached to the display 400. The view 12-II follows the view 12-I in a sequence.

In these implementations, the attachment mechanism comprises magnets incorporated into the frame 101. While optional, additional magnets can be incorporated into the display 400 at positions corresponding to the positions of the magnets at the fixture 100. Indeed, by positioning the magnets in each of the fixture 100 and the display 400, the magnets can be used to position the fixture 100 relative to the display 400, as corresponding magnets in each of the fixture 100 and the display 400 will be attracted to each other, moving the fixture 100 into place, as depicted in the view 12-II. Indeed, the position of the magnets is selected to ensure that the vision system 103 of the fixture 100 is in a position to image the predefined corner positions, as described above.

Alternatively, the display 400 includes metal, and the like, to which the magnets in the fixture 100 are attracted, and the magnets in the display 400 can be removed and/or left out of the display 400.

Once the display 400 is aligned, the fixture 100 is removed, for example by pulling the handles of the fixture 100.

Figure 13:
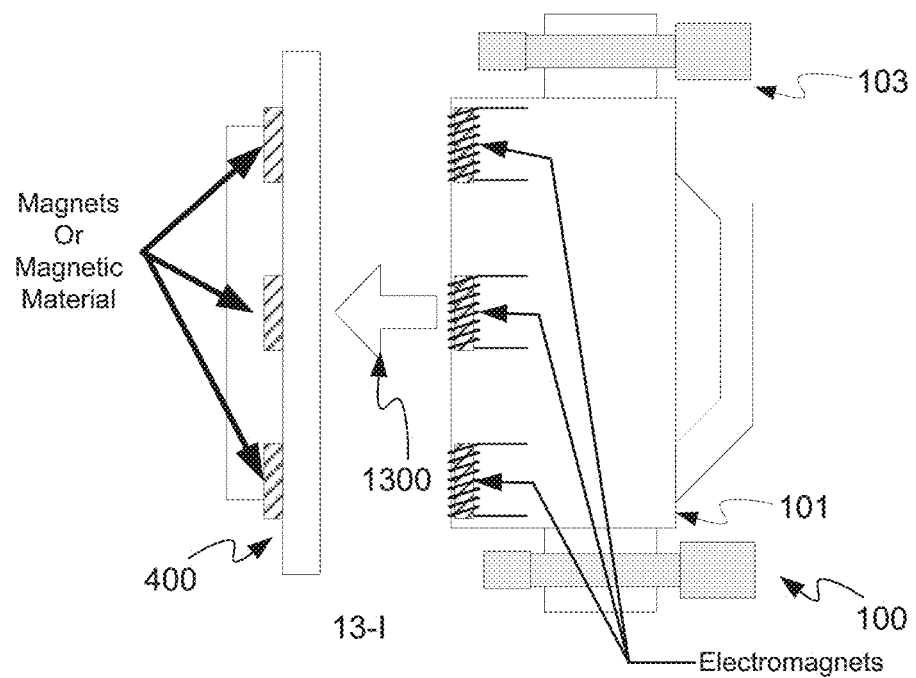
FIG. 13 depicts a schematic side view of a sequence of an alignment fixture being attached to a display, an attachment mechanisms of the alignment fixture including electromagnets, according to non-limiting implementations.
Figure 13:
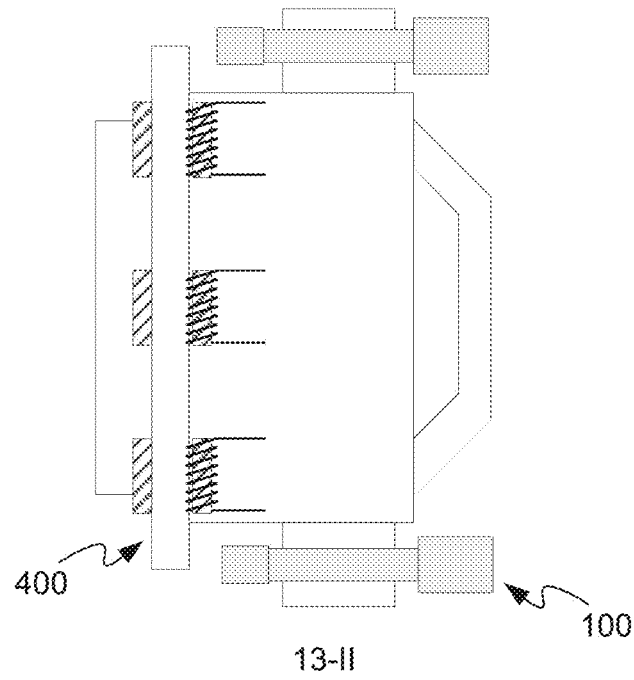

Attention is next directed to FIG. 13 which depicts, in a view 13-I, a schematic side view of the fixture 100 being attached to a front surface of the display 400, as indicated by the arrow 1300, and, in a view 13-II, a schematic side view of the fixture 100 attached to the display 400. The view 13-II follows the view 13-I in a sequence.

In these implementations, the attachment mechanism comprises electromagnets incorporated into the frame 101. While optional, additional magnets can be incorporated into the display 400 at positions corresponding to the positions of the electromagnets at the fixture 100, as in the implementation of FIG. 12.

Alternatively, the display 400 includes metal, and the like, to which the electromagnets in the fixture 100 are attracted, and the magnets in the display 400 can be removed and/or left out of the display 400.

Either way, the electromagnets of the fixture 100 are powered by either a battery of the fixture 100, or a connection to an external power supply.

Once the display 400 is aligned, power to the electromagnets is reduced and/or turned off, and the fixture 100 is removed using, for example the handles of the fixture 100.

Figure 14:
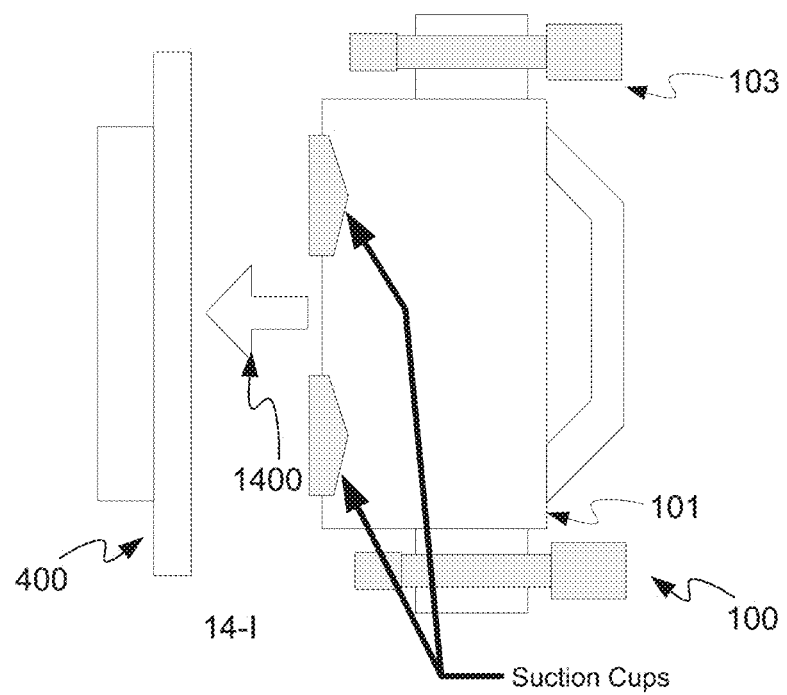
FIG. 14 depicts a schematic side view of a sequence of an alignment fixture being attached to a display, an attachment mechanisms of the alignment fixture including suction cups and/or suction devices, according to non-limiting implementations.
Figure 14:
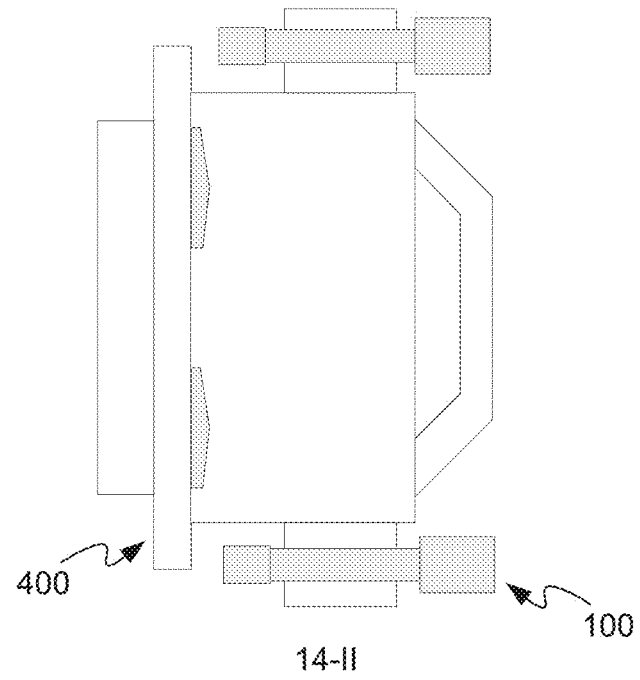

Attention is next directed to FIG. 14 which depicts, in a view 14-I, a schematic side view of the fixture 100 being attached to a front surface of the display 400, as indicated by the arrow 1400, and, in a view 14-II, a schematic side view of the fixture 100 attached to the display 400. The view 14-II follows the view 14-I in a sequence. In these implementations, the attachment mechanism comprises suction cups and/or suction devices incorporated into a rear side of the frame 101.

For example, the attachment mechanism can comprise passive suction cups that attach to the display 400 when pressure is applied to the suction cups (e.g. by pressing on the frame 101), or the attachment mechanism can comprise can comprise suction devices attached to a vacuum pump, and the like, which removes air from the suction devices to again attach the suction devices to the display 400, as in the view 14-II.

In implementations where the attachment mechanism comprises passive suction cups, once the display 400 is aligned, the fixture 100 is removed, for example by pulling the handles of the fixture 100 to break the seal/vacuum of the suction cups. In implementations where the attachment mechanism comprises suction devices attached to a vacuum pump, once the display 400 is aligned, power to the suction vacuum pump is reduced and/or turned off, and the fixture 100 is removed, for example by pulling the handles of the fixture 100 to break any remaining seal/vacuum of the suction devices.

Figure 15:
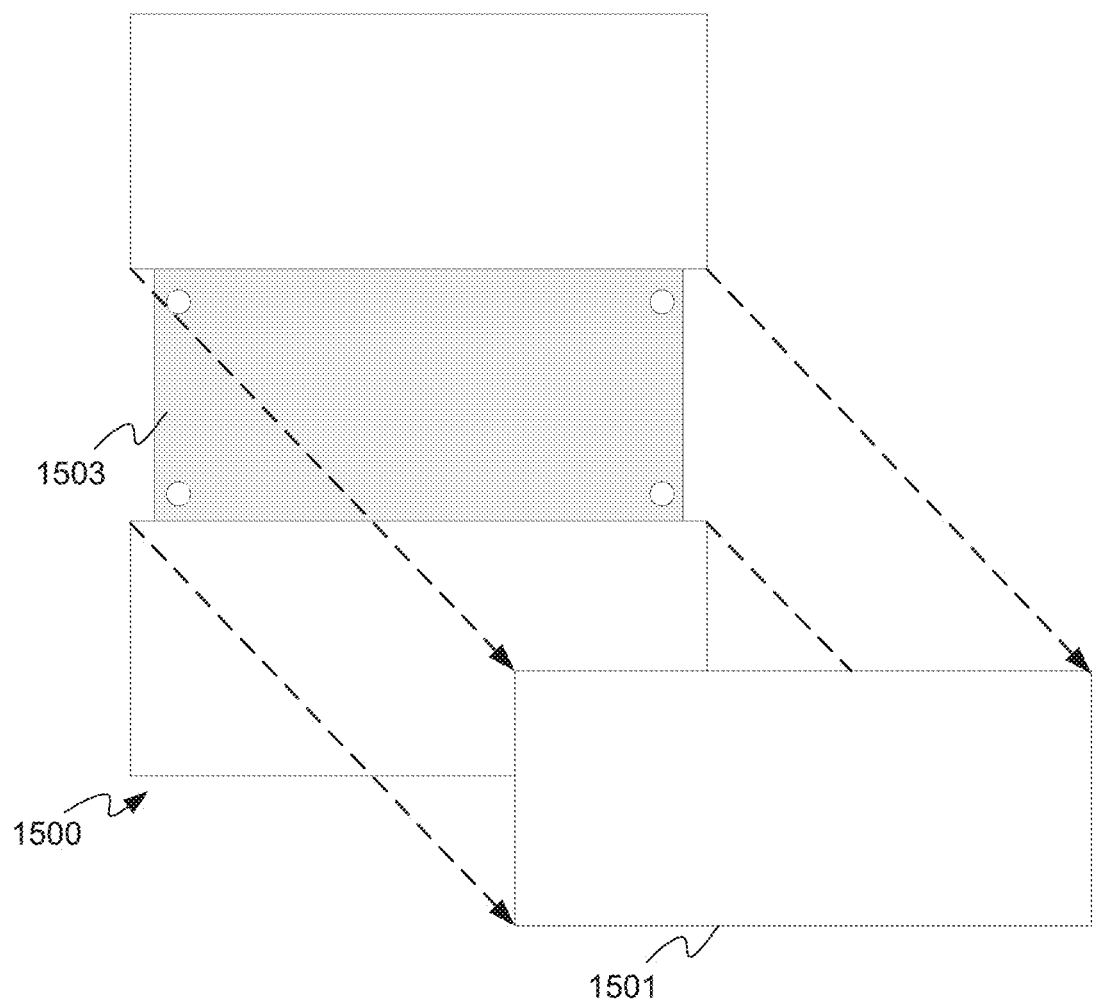
FIG. 15 depicts a display having a removable central sub-display unit, according to non-limiting implementations.

Attention is next directed to FIG. 15 which depicts a display 1500 that is similar to the display 400, however a sub-display unit 1501 (e.g. a central sub-display unit 1501) is removable to expose a support structure 1503. For example, the central sub-display unit 1501 is removably attached to the support structure 1503 using magnets, fasteners, and the like, and it is assumed that such removing, and reattachment, includes disconnecting, and connecting, the central sub-display unit 1501 to any electrical connectors at the support structure 1503 or elsewhere. In these implementations, the fixture 100 can be adapted for attachment to the support structure 1503.

Figure 16:
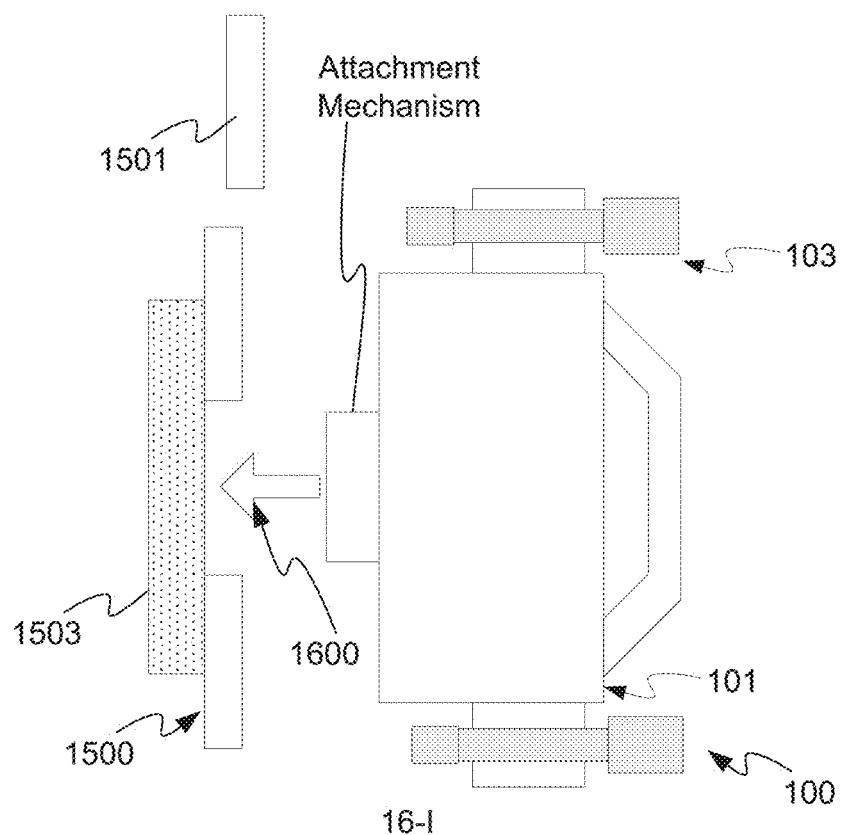
FIG. 16 depicts a schematic side view of a sequence of an alignment fixture being attached to the display of FIG. 15, at a gap left by the removed central sub-display unit, according to non-limiting implementations.
Figure 16:
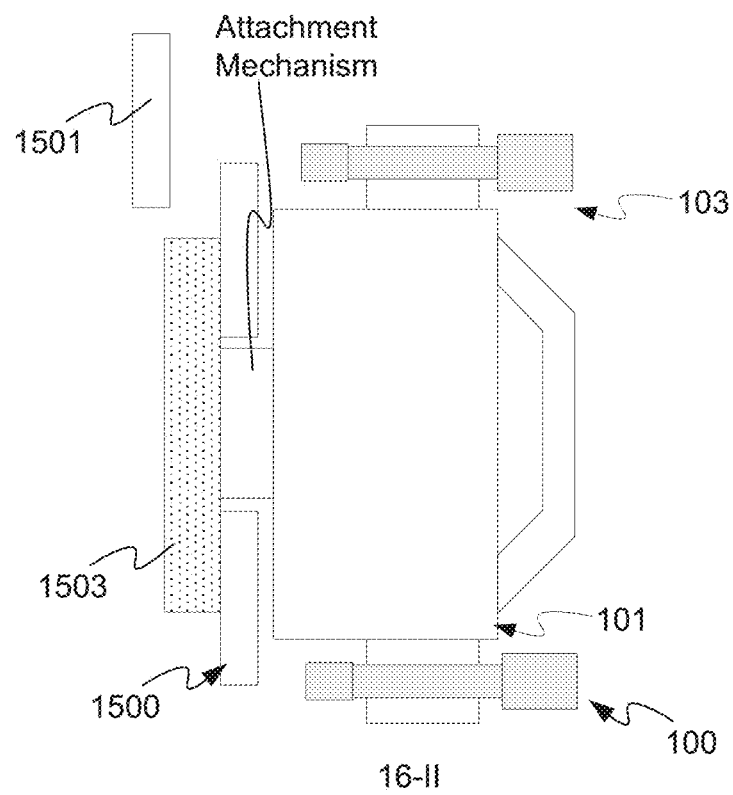

For example, attention is next directed to FIG. 16 which depicts, in a view 16-I, a schematic side view of the fixture 100 being attached to the support structure 1503 of the display 1500 when the central sub-display unit 1501 is removed, as indicated by the arrow 1600, and, in a view 16-II, a schematic side view of the fixture 100 attached to the support structure 1503 of the display 1500. The view 16-II follows the view 16-I in a sequence.

In these implementations, the attachment mechanism comprises magnets, electromagnets, suction cups, suction devices, mechanical fasteners, hooks, and the like, that extend from the frame 101 into a gap of the display 1500 that is created when the central sub-display unit 1501 is removed. For example, the attachment mechanism can comprise a portion of the frame 101 that extends into the gap towards the support structure 1503, and the magnets, electromagnets, suction cups, suction devices, mechanical fasteners, hooks, and the like, are incorporated into the portion of the frame 101 that extends into the gap. Dimensions of the portion of the frame 101 are selected to maintain the given working distance of the lenses and/or cameras of the vision system 103, as described above.

In any event, the vision system 103 images the predefined display corner positions defined by given display dimensions of the display 400 (e.g. the four outermost corners), and the display 1500 is aligned as described above.

Once the display 1500 is aligned, the fixture 100 is removed and the central sub-display unit 1501 is replaced at the display 1500.

In some implementations, the support structure 1503 is adapted for attachment to the attachment mechanism of the fixture 100, for example by incorporating magnets and/or mechanical devices into the support structure 1503 that mate with magnets and/or mechanical devices of the attachment mechanism of the fixture 100.

Figure 17:
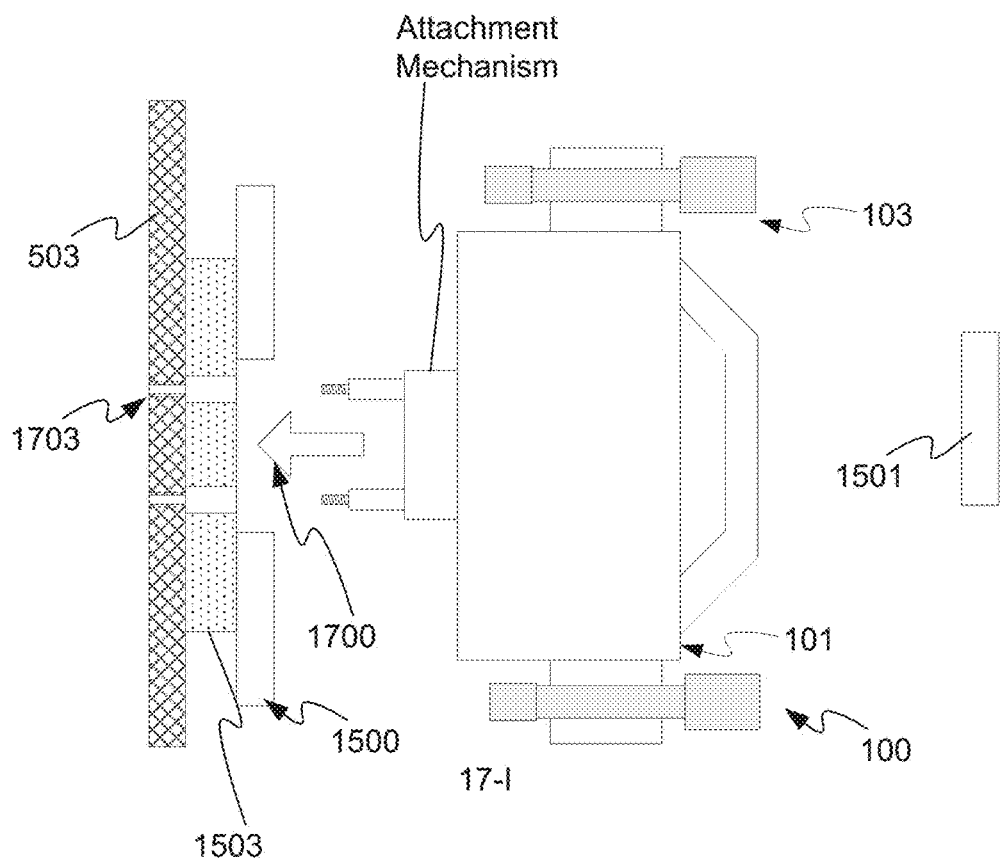
FIG. 17 depicts a schematic side view of a sequence of an alignment fixture being attached to the display of FIG. 15, an attachment mechanisms of the alignment fixture including mechanical fasteners configured to mate with corresponding fastener openings in a support structure of the display and/or an array, according to non-limiting implementations.
Figure 17:
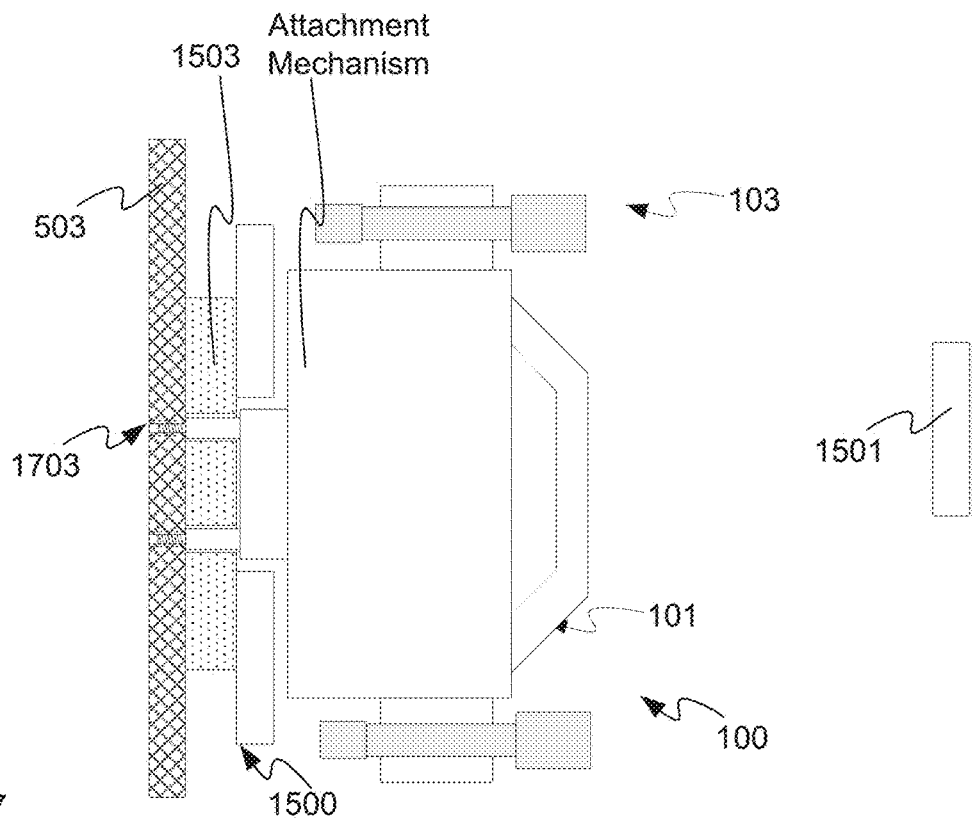

For example, attention is next directed to FIG. 17 which depicts, in a view 17-I, a schematic side view of the fixture 100 being attached to the support structure 1503 of the display 1500 when the central sub-display unit 1501 is removed, as indicated by the arrow 1700, and, in a view 17-II, a schematic side view of the fixture 100 attached to the support structure 1503 of the display 1500. The view 17-II follows the view 17-I in a sequence.

However, in these implementations, the attachment mechanism of the fixture 100 comprises one or more mechanical fasteners configured to mate with corresponding fastener openings 1703 in the support structure 1503 and, optionally, the frame 503 of the array 500. In the mated position, as depicted in the view 17-II, the one or more mechanical fasteners of the attachment mechanism of the fixture 100 are frictionally retained by the corresponding fastener openings 1703 in the support structure 1503 and the frame 503. In some of these implementations, as depicted, the one or more mechanical fasteners of the attachment mechanism of the fixture 100 are complementary in shape to the corresponding fastener openings 1703 and vice versa, such that complementary surfaces of each reside against each other in the mated position. In some of these implementations, one of more of the complementary surfaces are roughened and/or textures to increase the coefficient of static friction therebetween.

Once the display 1500 is aligned, the fixture 100 is removed and the central sub-display unit 1501 is replaced at the display 1500.

While certain attachment mechanisms are described herein, other attachment mechanisms will occur to persons of skill in the art and are within the scope of present implementations.

In any event, provided herein is an alignment fixture that incorporates a vision system that images corners of adjacent displays to align corners and/or corner pixels of the adjacent displays, for example using small field-of-view (FOV) cameras. As a frame holds the cameras in fixed positions, for example with respect to adjacent display corners when the fixture is in use, the relative camera positions are extremely stable, which can ensure that the adjacent display corners are within the field-of-view of the cameras. Furthermore, the alignment precision possible with the fixture can be more precise and repeatable than what is possible with technician visual alignment, and further does not require extensive camera setup and adjustment as is used with typical off-board camera inspection of LED arrays.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
    a frame;
    an attachment mechanism configured to removably attach the frame to a front surface of one tiled display, of an array of tiled displays, the array of tiled displays supported by a rear support structure opposite a front of the array, the frame being different from the rear support structure, each of the tiled displays, including the one tiled display, each having given display dimensions; and
    four cameras located at respective predefined display corner positions defined by the given display dimensions, the four cameras supported by the frame, the four cameras configured to image respective corners of the one tiled display as defined by the given display dimensions, and adjacent display corners of other tiled displays adjacent the one tiled display,
    wherein the frame supports each of the four cameras such that respective lenses of the four cameras are at a given working distance from the front surface of the one tiled display, the respective lenses having a respective field of view and depth of field which define the given working distance.

2. The device of claim 1, further comprising a display device configured to render images from the four cameras.

3. The device of claim 1, further comprising an interface to a remote computing device.

4. The device of claim 1, wherein the attachment mechanism comprises magnets that attach to the front surface of the one tiled display.

5. The device of claim 1, wherein the attachment mechanism comprises electromagnets that attach to the front surface of the one tiled display.

6. The device of claim 1, wherein the attachment mechanism comprises one or more of suction cups and suction devices that attach to the front surface of the one tiled display.

7. A system comprising:
    an array of tiled displays attached to a rear support structure such that corners of adjacent tiled displays are adjacent to one another, a respective position of each of the tiled displays being adjustable relative to the rear support structure, each of the tiled displays having given display dimensions; and, a device comprising:

a frame different from the rear support structure;

an attachment mechanism configured to removably attach the frame to a front surface of one tiled display, of the array of tiled displays; and four cameras located at respective predefined display corner positions defined by the given display dimensions, the four cameras supported by the frame, the four cameras configured to image respective corners of the one tiled display as defined by the given display dimensions, and adjacent display corners of other tiled displays adjacent the one tiled display, wherein the frame supports each of the four cameras such that respective lenses of the four cameras are at a given working distance from the front surface of the one tiled display, the respective lenses having a respective field of view and depth of field which define the given working distance.

8. The system of claim 7, wherein the respective position of each of the tiled displays are further adjustable with respect to one or more of pitch, angle and rotation of the tiled displays.

9. A device comprising:

a frame;

an attachment mechanism configured to removably attach the frame to a front surface of one tiled display of an array of tiled displays each having given display dimensions; and four cameras configured to image at predefined display corner positions defined by the given display dimensions, such that the four cameras capture respective images of respective corners of the one tiled display and corners of other tiled displays adjacent the respective corners of the one tiled display, the frame supporting the four cameras such that the respective corners of the one tiled display and the corners of other tiled displays adjacent the respective corners of the one tiled display are in focus in the respective images, wherein the frame supports each of the four cameras such that respective lenses of the four cameras are at a given working distance from the front surface of the one tiled display, the respective lenses having a respective field of view and depth of field which define the given working distance.

\* \* \* \* \*